United States Patent Office 3,702,679
Patented Nov. 14, 1972

3,702,679
APPARATUS FOR ATOMIZING LIQUIDS BY CENTRIFUGATION
Angelo Mazzini, Via Caccialepori 17, Milan, Italy
Filed Feb. 3, 1971, Ser. No. 112,220
Claims priority, application Italy, Mar. 31, 1970, 22,691/70
Int. Cl. B05b *3/02;* F23d *11/04*
U.S. Cl. 239—222.11                    4 Claims

ABSTRACT OF THE DISCLOSURE

A new apparatus for atomizing liquids, in particular water, by centrifugation which does not require considerable power for the centrifugal system of high pressure for the liquid, while reducing the losses of the non-atomized liquid. A double centrifugal feeding is provided at the both ends of a shaft of an electric motor to which are coaxially fixed two disk wheels each arranged within and coaxially to a stationary toothed crown wheel.

BACKGROUND OF THE INVENTION

This invention relates to a new apparatus for atomizing liquids by centrifugation, in particular water, for the purpose of using the latter in the form of mist in industrial processes. Said nebulization is particularly employed in air-conditioning processes and especially in the saturation and/or oversaturation of air required to treat industrial buildings wherein the relative moisture content has to be kept at a constant and rather high degree (for example in textile, wood, paper processing, etc.).

Many apparatus and methods are known for solving this technical problem. Leaving aside the methods based on the use of water under pressure or a mixture of water and compressed air, the known systems of the so-called turbine type may be reduced to two basic types, namely the rotating disk system and the jet system.

In the former system, water is sprayed through a small feeding pipe onto a disk which is caused to rotate at a high speed. As a result of the centrifugal force, the water which enters into contact with the disk at the center thereof flows towards the peripheral part of the disk, while accelerating. The thin water blade then leaves the disk, breaks up against a stationary crown gear and is thereby divided into minute droplets. On the contrary, the jet system is based on the fact that the water is issued under pressure, or centrifuged through a number of small nozzles. The water jets are directed against the blades of a generally axial fan acting as a movable crown gear. Also in this case, the result is that the liquid injected into the apparatus is very finely divided. These systems as well as those derived therefrom however imply the drawback that the atomizing apparatus requires considerable power, especially if it is of high speed-type. With these known systems moreover, the liquid has to be fed under a certain pressure in order for it to be sprayed conveniently and in the appropriate quantity onto the rotating disk or crown wheel. A further considerable drawback is the low water yield of said known devices which have to be fed with a quantity of liquid by far exceeding the actually atomized quantity, inasmuch as a high percentage thereof is immediately lost and conveyed to the draining device. This of course involves high operation costs, especially for plants situated in places where water is available in limited quantities and the consumptions therefore have to be strictly reduced.

Finally, as far as the high speed systems are concerned, particular conditions of mechanical stresses have to be faced, which often result in breakdowns, insofar as the rotating members operate under hard conditions, especially in view of the oxidation processes to which they are submitted.

SUMMARY OF THE INVENTION

It is an object of the present invention to provide an apparatus for atomizing liquids, which to a large extent obviates the aforesaid drawbacks. In designing and constructing this new apparatus, there has been adopted the concept of replacing the jet feeding on the rotating disk by a double centrifugal feeding. An important advantage of the apparatus according to this invention is that no pressure is required for feeding the turbine, inasmuch as the centrifugal feeding system produces by itself the pressure required for feeding the rotating disk. It is not even necessary to reach very high speeds to obtain high quantities of atomized liquid insofar as the coupling of the two sprayers makes it possible to maintain the speed within normal limits for a motor. Consequently, all the speed multiplication devices, both mechanical and electric (frequency converters), are eliminated, and contemporarily the corresponding causes for breakdown are removed. Another considerable advantage is that the atomized liquid practically represents the total liquid fed in particular water, since there do not occur any losses due to rejection by the members in movement before the liquid reaches the atomizing points. The result thereof is is a noticeable increase in the performance of the system, involving a considerable reduction in water consumption and, therefore, in the operating cost.

It is still possible moreover to enhance the sprayed liquid yield by feeding it to a number of points on both, front and rear, surfaces of the disk. As a result of all these features, the apparatus according to the present invention moreover involves a reduced energy consumption, or, to say it better, a minor consumption of specific power per kg. of atomized liquid with respect to the prior art apparatus.

BRIEF DESCRIPTION OF THE DRAWINGS

Further objects, advantages and features of the apparatus according to the present invention will be evident to those skilled in the art from the following detailed description of an embodiment thereof, given by way of non-limiting example, with reference to the accompanying drawings, wherein.

DETAILED DESCRIPTION OF THE PREFERRED EMBODIMENT

Figure 1:
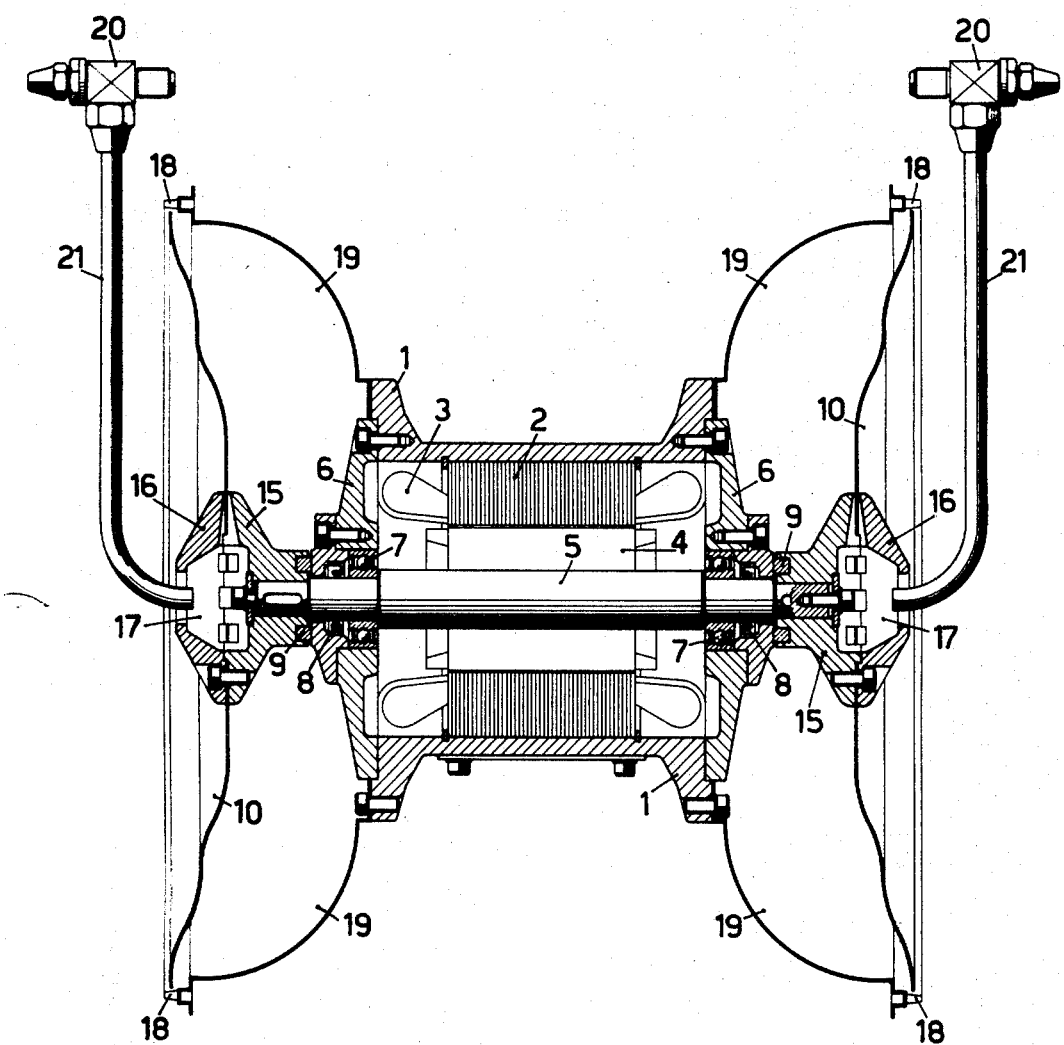
FIG. 1 is a longitudinal section view of the apparatus according to the present invention.
Figure 2:
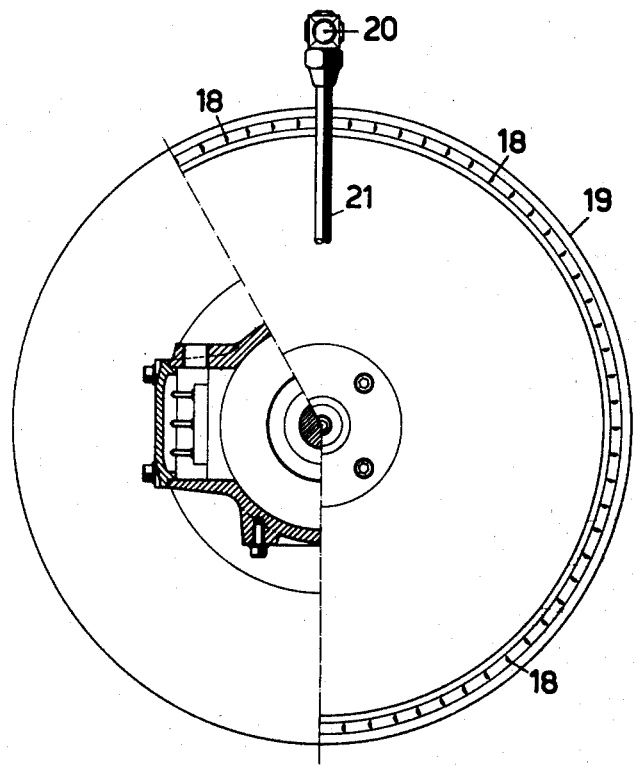
FIG. 2 represents a front-view, partly in section, of the apparatus shown in FIG. 1.

With reference to the drawings, there can be seen that that apparatus substantially consists of a double disk wheel mounted at the two ends of a motor shaft. Observing FIG. 1, the stator 1 of an electric motor together with its core of laminations 2 and the heads of the windings 3 can be seen. The rotor 4 is integral with the motor shaft 5, each end of which, supported by an antifriction bearing 7 housed in the lateral locking box or head 6, transmits the movement to a distributor hub 15. Between the distributor hub 15 and a ring nut of the distributor 16 there is fixed a disk 10 shaped as in FIG. 1. The shaft 5 is provided at both ends with sealing rings 8 and the hub 15 with protection rings 9. Between the hub 15 and the ring nut 16 there is defined at both ends of the shaft 5, a chamber 17 with at its inlet a feeding pipe 21 connected for example to the water distributing system through a regulator 20.

Concentrically to the disk 10 and not very distant from the outer edge thereof is a crown wheel provided with stationary teeth or small blades 18, mounted onto a metal cup 19 conveniently fixed to the stator 1. Both cups 19 are assembled so as to present their concavity towards their respective disk 10.

Figure 3:
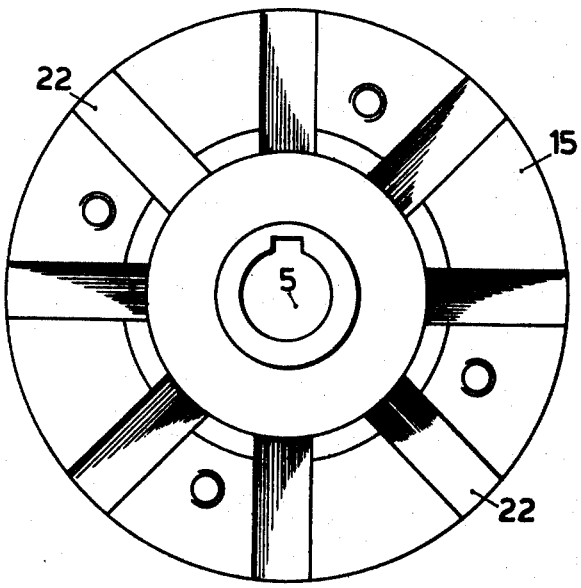
FIG. 3 represents a front-view of a detail (hub of the distributor) of said apparatus.

As can be seen in FIG. 3, the hub of the distributor presents a number of radial channels 22 (in this case eight) and an equal number of radial channels corresponding to the preceding ones are present on the ring nut 16 of the distributor.

The water, or liquid in general depending on the utilizations, reaches the inlet 17 of the disk wheel by passing through the feeding pipe 21 in the amount required and dosed by the regulator 20. The motor, and accordingly the whole group mounted at both ends thereof, rotates at a rate of about 3,000 revolutions per minute. As a result of the centrifugal force thus generated, the liquid is obliged, by passing through the radial channels 22 provided on the hub and on the ring nut of the distributor, to feed the disk 10 on both, front and rear, surfaces. The liquid flows over the whole outer and inner surface of the disk 10 dragged in rotation which in the very last end behaves as a centrifugal disk wheel having an infinite number of blades.

The liquid, thrown violently towards the peripheral part of the disk 10, leaves the latter and is projected against the crown of stationary teeth 18, being instantaneously atomized. The cup 19, besides acting as a support of the toothed crown, prevents the atomized liquid from being dispersed and propagated towards the central part of the apparatus. The atomizing system is mounted in couple at the both ends of the electric motor shaft whose housing 1 is a joining body between the two atomizing systems.

The thus atomized liquid is ready for being employed in any application wherein water or any other liquid is required to be reduced into minute particles. As already said, the most important use of said apparatus is in moisturizing systems of any kind, air-conditioning systems, hydroscopic enrichment and washing of gas streams. Particularly important is the use of these groups in all the industrial conditioning processes wherein a cooling is required to be obtained according to the so-called adiabatic cycle, i.e. in the processes wherein a part of the sensible heat of a gas is converted into latent heat. The atomizing system according to this invention may however also be suited to many spray drying processes, in particular in lycphilization processes in which latter case the greatest possible water content is extracted from the atomized solution at adequate temperatures. Possible additions and/or modifications may be contributed by those skilled in the art to the embodiment of the atomizing system according to the present invention described and illustrated hereinabove by way of non-limiting example, without therefore departing from the scope defined by the appended claims.

What I claim is:

1. An apparatus for atomizing liquids by centrifugation, which comprises: motor means including a stationary outer portion and a rotatable shaft therein; a first and second disk wheel each having two surfaces and each arranged coaxially with respect to said shaft and each mounted for rotation therewith at opposite ends of said shaft; two stationary toothed crown wheels, each of which is concentric with respect to one of said disk wheels; and means for feeding the liquid to be atomized to the center and both surfaces of each of said disk wheels.

2. An apparatus as claimed in claim 1, wherein said feeding means comprises for each disk wheel a feeding pipe provided with a regulator, distributor means mounted at the center of each disk wheel comprising a hub and a ring nut having a number of radial channels beginning in a central zone where the said feeding pipe abuts and leading to both surfaces of each said disk wheel.

3. An apparatus as claimed in claim 1, wherein each of the two stationary toothed crown wheels is mounted onto a concave metal cup having its concavity directed towards the corresponding disk wheel, said concave cup being located between said motor means and said disk wheel.

4. An apparatus as claimed in claim 1 wherein said motor means comprises means to drive said shaft and disk wheel at a rate of about 3,000 revolutions per minute.

References Cited

UNITED STATES PATENTS

| | | | |
|---|---|---|---|
| 2,408,511 | 10/1946 | Gothard | 239—222.19 |
| 2,815,246 | 12/1957 | Nyrop | 239—222.19 |
| 2,159,400 | 5/1939 | Preston | 239—222.11 |
| 2,220,275 | 11/1940 | Preston | 239—222.11 |
| 3,085,749 | 4/1963 | Schweitzer et al. | 239—222.11 |

FOREIGN PATENTS

| | | | |
|---|---|---|---|
| 17,784 | 3/1908 | Great Britain | 239—222.11 |

LLOYD L. KING, Primary Examiner

U.S. Cl. X.R.

239—380